United States Patent
Lützkendorf et al.

(10) Patent No.: US 8,904,604 B2
(45) Date of Patent: Dec. 9, 2014

(54) DEVICE FOR UNDOING TEXTILE FIBER BUNDLES

(75) Inventors: Renate Lützkendorf, Königsee (DE); Gerald Ortlepp, Uhlstädt-Kirchhasel (DE)

(73) Assignee: Thüringisches Institut für Textil—und Kunststoff-Forschung e.V., Rudolstadt (DE)

( * ) Notice: Subject to any disclaimer, the term of this patent is extended or adjusted under 35 U.S.C. 154(b) by 0 days.

(21) Appl. No.: 13/882,994

(22) PCT Filed: Nov. 25, 2010

(86) PCT No.: PCT/DE2010/001367
§ 371 (c)(1),
(2), (4) Date: May 2, 2013

(87) PCT Pub. No.: WO2012/069026
PCT Pub. Date: May 31, 2012

(65) Prior Publication Data
US 2013/0227820 A1 Sep. 5, 2013

(51) Int. Cl.
*D01G 11/02* (2006.01)
*D01G 7/02* (2006.01)

(52) U.S. Cl.
CPC . *D01G 11/02* (2013.01); *D01G 7/02* (2013.01)
USPC .......................................................... 19/82

(58) Field of Classification Search
USPC ............................................. 19/82; 222/238
See application file for complete search history.

(56) References Cited

U.S. PATENT DOCUMENTS

| | | | | |
|---|---|---|---|---|
| 1,721,086 A | | 7/1929 | Perry | |
| 2,306,698 A | * | 12/1942 | Heller et al. | 23/314 |
| 2,489,846 A | * | 11/1949 | Ammerall | 19/65 R |
| 2,794,454 A | * | 6/1957 | Moulthrop | 141/67 |
| 3,159,880 A | * | 12/1964 | Carpenter | 19/82 |
| 3,351,106 A | * | 11/1967 | Moulthrop | 141/67 |
| 3,693,836 A | * | 9/1972 | Eisner | 406/99 |
| 3,886,629 A | * | 6/1975 | Nakai et al. | 425/83.1 |
| 4,157,724 A | * | 6/1979 | Persson | 141/1 |
| 4,217,680 A | * | 8/1980 | Hollaway et al. | 19/0.46 |
| RE31,775 E | * | 12/1984 | Persson | 141/1 |
| 4,664,160 A | * | 5/1987 | Rothstein et al. | 141/67 |
| 5,103,879 A | * | 4/1992 | Hickerson | 141/67 |
| 5,257,831 A | * | 11/1993 | Garcia | 241/42 |

(Continued)

FOREIGN PATENT DOCUMENTS

DE 2935168 A1 3/1980

*Primary Examiner* — Shaun R Hurley
(74) *Attorney, Agent, or Firm* — Michael Soderman

(57) ABSTRACT

Device for mechanically splitting finite textile fiber bundles, comprising n individual fibers (n≥2) in fiber bundles having less than n individual fibers and/or individual fibers, characterized in that in a milling chamber that is closed off from the outside and that has one or more dead spaces of at least 10% of the milling chamber volume and in which one or more rotating striking elements operate in a non-cutting manner and so as to reduce load peaks and at a rotational speed that can be adapted to the material but that is at least 200 r.p.m., the material is adjustably input in different amounts in batches, treated for an adjustable duration, and then discharged again from the milling chamber.

7 Claims, 1 Drawing Sheet

(56) References Cited

U.S. PATENT DOCUMENTS

| | | | |
|---|---|---|---|
| 5,829,649 A * | 11/1998 | Horton | 222/636 |
| D427,209 S * | 6/2000 | Collida et al. | D15/66 |
| 6,109,488 A * | 8/2000 | Horton | 222/636 |
| D490,089 S * | 5/2004 | Box et al. | D15/66 |
| 6,796,457 B2 * | 9/2004 | Sperber | 222/1 |
| 6,796,748 B1 * | 9/2004 | Sperber | 406/123 |
| 7,938,348 B2 * | 5/2011 | Evans et al. | 241/60 |
| 8,061,568 B2 * | 11/2011 | Fenton | 222/636 |

\* cited by examiner

DEVICE FOR UNDOING TEXTILE FIBER BUNDLES

CROSS REFERENCE TO RELATED APPLICATIONS

This application is the U.S. national stage of International Application No. PCT/DE2010/001367, filed on Nov. 25, 2010, and claims the benefit thereof.

BACKGROUND

The invention relates to a device with which textile fiber bundles, consisting of n finite, individual fibers (n=2, 3, 4 . . . ) adhering to one another, can be mechanically split up into fiber bundles with less than n individual fibers, even down to individual fibers.

When processing fibrous materials, it is very important to have them available in a heavily isolated form or, more precisely, only in the form of thin or finer residual fiber bundles starting at a certain processing stage.

Fibrous materials frequently only exist in the form of fiber bundles in the starting material, however, or there are high proportions contained in the starting material. This could, on the one hand, be cut-fiber bundles in a length range of 3 to 100 mm, mechanically opened natural fibers or textile-type products such as fibrous fabric, multiaxial fibrous layings and braids based on multi-filament or staple fiber yarns from which individual fibers are to be obtained.

A multitude of different techniques are applied on a material-specific basis today for bundle-separating processes of that type. They are textile separators, tearing machines, combs or carding machines as a rule. They are very expensive in terms of the machinery and can only be used for certain materials containing fiber bundles and sometimes only when fiber shortening, mechanical damage or only minor fiber-bundle splitting effects are accepted. It is frequently necessary to run the material through several systems one after the other for an adequate effect. Textile separators, combs and carding machines only work with fiber bundles with lengths of around 30-100 mm when the requirement is met that the fibers have curling. Tearing machines are used for multiaxial layings, fabric and woven materials in lumps. There is no known device to efficiently unravel or split up fiber bundles for cut bundles of short fibers with the customary bundle lengths of 3 to 12 mm and also in general for smooth fiber bundles without fiber curling.

Bundles of natural fibers are refined via combing processes in special machines or have to be chemically separated.

The drawbacks of these methods are:
High expenses for equipment and energy
Limited universality with regard to the use of material
High levels of mechanical damage and severe fiber shortening, especially in the case of tearing machines.
Unsuitability for smooth fiber bundles or any short-fiber bundles.

A characteristic of all of these mechanical processes is that the material is separated into fibers with pins and toothed rollers; either different rollers operate in a combing fashion against one another or a roller rips the material out of a fixed material clamping unit.

Only a method and a device for unraveling fabrics into the fiber components are known according to DE 199 00 770 A1, with which bundle-splitting effects of this type can be sporadically created as an incidental side effect. This device that is described in DE 199 00 770 A1 is only useful for applications in the area of textile recycling and specifically here only for turning planar fabric pieces into their yarn components. Fabric is exclusively used here as a starting material; the main objective of the device described above consists in destroying the fiber crossings and weavings at right angles between the warp and weft yarns that were created in a defined way in the weave existing in the fabrics for the purpose of recovering these fibers. According to DE 199 00 770 A1, an unraveling of filament yarn sections, even down to individual fibers, simultaneously comes about in the process in a few cases when there are fabrics made of filament yarns. That is an incidental side effect that only arises in rare cases, but it is not adequate for an economical exploitation of the effect. Only the use of this device that was described would not be sufficient for separation of the fibers right down to individual fibers. Further additional, subsequent mechanical process steps in accordance with claim 9 in DE 199 00 770 A1 have to be added to that.

SUMMARY

Device for mechanically splitting finite textile fiber bundles, comprising n individual fibers (n≥2) in fiber bundles having less than n individual fibers and/or individual fibers, characterized in that in a milling chamber that is closed off from the outside and that has one or more dead spaces of at least 10% of the milling chamber volume and in which one or more rotating striking elements operate in a non-cutting manner and so as to reduce load peaks and at a rotational speed that can be adapted to the material but that is at least 200 r.p.m., the material is adjustably input in different amounts in batches, treated for an adjustable duration, and then discharged again from the milling chamber.

DETAILED DESCRIPTION

The problem involved with this invention is to therefore split fiber bundles lengthwise in a very gentle way with a device that can be universally used, in order to obtain individual fibers, finer fiber bundles or a mixture of individual fibers and finer fiber bundles. This problem is solved in accordance with the invention by means of a modified mill, as show in the form of an example in FIG. 1, in which the device that is described is in a position, in contrast to the device from DE 199 00 770 A1, to obtain individual fibers from fiber bundles with gentle treatment of the material by substantially increasing the effect of the lengthwise splitting of the fiber bundle via design changes and simultaneously ensuring the gentle treatment of the material, which represents inventive novelty vis-a-vis the prior art.

The invention is to be explained in more detail below by way of example and with the aid of sectional views in FIGS. 1 and 2. The starting textile material with a fiber bundle length of 1 to 200 mm is input into the material supply unit 3 in batches or in a continuous fashion. The quantity of material that is fed in is dependent upon the type of material and the construction design of the milling or stator chamber 2 in combination with the propeller-type striking elements or a striking unit 1. The striking unit 1 preferably has several propeller-type, equally structured, vane-type striking elements 7 that are arranged next to one another on a drive shaft 8.

The striking unit, which does not cut as it operates, in combination with a dead-space volume of at least 10%, which is not entered by the rotating striking elements, is important for the gentle treatment of the material and a high bundle-splitting effect. A drive unit that is not shown here drives the striking unit 1 with a rotary speed of at least 200 r.p.m. that remains constant as a rule and that can preferably be selected in accordance with the material.

When there is a continuous supply of material, the material batch that is to be processed is fed into the milling chamber at defined intervals using gravity via a time-controlled flap mechanism 6; the previous material batch is always transferred out of the treatment chamber before the feed-in process via the material discharge unit 4 and a time-controlled flap mechanism 5. The flaps that transfer material in or out can be designed with perforations or in the form of a sieve plate.

The fiber material that is moved via gravity or also in a pneumatic fashion through the zone of rotating striking elements is processed by striking it. The fiber bundles that are added, the fibers of which are held together via adhesion, cohesion and/or twisting or even via integration into a textile area, are unraveled in the process and broken down into fiber bundles with fewer individual fibers, even down to individual fibers, so individual, randomly oriented fibers or heaps with the diameter of small bundles can be transferred out through the removal area 4 with the outlet flap 5 that can be opened after the end of a defined, material-specific, constant treatment time.

The stator wall can be designed to have a roughness that differs depending on the material or can be provided with retaining elements projecting into the dead space. The striking elements should be able to reduce peaks in force for gentle treatment of the material by tipping against the direction of rotation when forces of that type are acting, for example, thereby releasing more dead-space volume for incidental material accumulations for a short period and then springing back into their starting position again after that.

As an example, 2 basic designs of that type to realize load-controlled dead-space volume via an elastic, rebounding striking-element configuration are shown as examples in FIG. 2. The first illustration in FIG. 2 shows a 2-part striking element 7 that rotates in the direction of the arrow c via the drive shaft 8. A pressure-spring mechanism additionally acts in the direction of the centrifugal force and ensures a spacing a to the stator wall.

In the case that there are load peaks because of incidental material accumulations, the upper part of the striking element tilts against the direction of rotation and thus increases the spacing to the stator wall to the quantity b; additional local dead-space volume is released for a short period of time because of that to reduce the mechanical load peak acting on the material. After the load peak, the striking element returns to its starting position again. When the striking-element part designed to be tiltable has a sufficient mass and there are high peripheral velocities, the spring element 9 can also be eliminated and the restoring force will be solely ensured by the centrifugal force.

The two other diagrams show 2 principles of undivided striking elements that are designed to be elastic on the material side such that they can evade material accumulations that are too high against the direction of rotation for a short period of time when there are load peaks and thus release load-reducing, additional dead-space volume in the treatment chamber.

After the treatment that splits up the fiber bundles, the material is transferred out of the treatment chamber via a material discharge unit 4 (FIG. 1). The material outlet flap 5 is opened for a short period of time on a time-controlled-basis for this. The striking elements continue to rotate in the process and generate a discharge force ensuring that the material is discharged via the material rotation. The material can be discharged into a storage container or into a flanged-on, pneumatically suctioned material transport pipe.

The material used for processing is dry as a rule, but it can also have moisture of up to 50%. The fibers can also be pretreated with a corresponding preparation for the purpose of improving the frictional and sliding properties or for the purpose of reducing the electrostatic charge of the fibers.

The device has to operate within a technological window that is adapted to the material in each case to achieve an economically useful, fiber bundle splitting effect.

It is a matter here of simultaneously processing the material in a very gentle way, so that the fibrous materials will only be split lengthwise and not torn cross-wise, sheared through, cracked or mechanically damaged in such a way that their tensile strength or modulus of elasticity in tension is reduced. A determination of optimal windows with regard to the treatment parameters of the material quantity per treatment batch and treatment time and the technical layout of the device is necessary for that.

The device should preferably have the following characteristic features to ensure this adaptability to various materials or given material variations:

Discontinuous batch operation with a capability of selecting the bundle-splitting treatment time, Capability of selecting the rotary speed of the propeller-type striking elements, Adjustability of the dead-space volume via exchangeable striking-element geometries in proportion to the stator, Load-dependent release of additional dead space during the material treatment, Exchangeable striking rotors with different load sensitivities for a short-term release of additional dead-space volume, Variably exchangeable internal stator linings with regard to the roughness and additional retaining elements that project into the dead-space area.

The device is suitable for processing, in an especially gentle way for the fibers in terms of the reduction of the length of the fibers and the degradation of characteristic mechanical values, a broad diversity of goods in fiber bundles from the areas of short cut fibers, curled and uncurled staple fibers, natural fibers with a naturally occurring fiber-bundle structure such as flax, hemp and nettles, lump-form multiaxial layings, fabric and woven materials, and rope and belt sections into materials containing individual fibers with few bundles for the most diverse applications in the area of further textile processing or the use in fiber-reinforced plastics, rubber and elastomers.

DETAILED DESCRIPTION OF THE PREFERRED EMBODIMENT

The device in accordance with the invention is suitable for separating the fibers of the most diverse textile materials containing fiber bundles, as Examples 1 to 3 show.

Example 1

Figure 1:
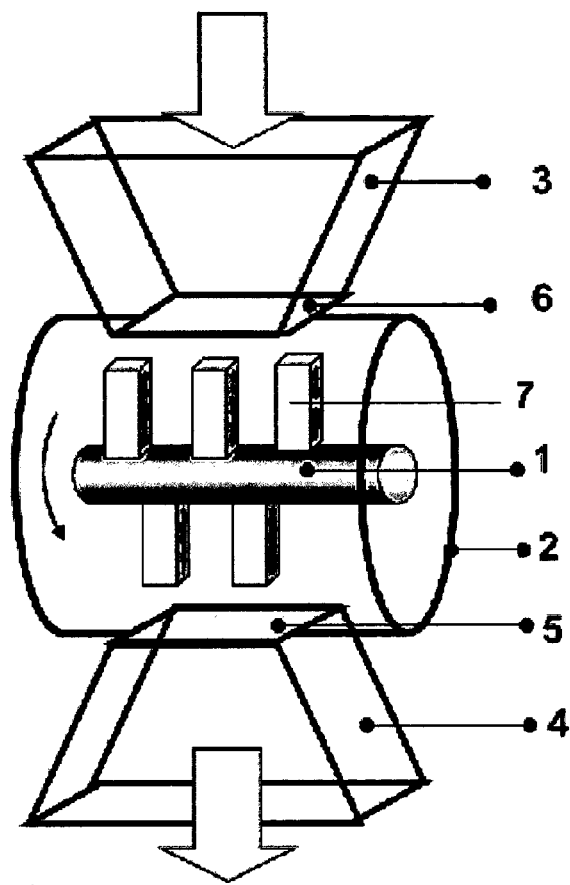
FIG. 1 shows a schematic diagram of an example of a device for undoing fiber bundles as per the invention.

250 g of para-aramid filament yarn with fineness 336 Tex cut to 40 mm was processed for 15 s in a device in accordance with FIG. 1 using a sieve plate with a hole width of 5 mm. The rotor with 4×8 striking elements arranged next to one another rotated at 1000 r.p.m. The two-piece tilting variant shown in FIG. 2 was used as an especially gentle striking-element variant; a spring element that additionally rebounds was not necessary because of the high peripheral velocity. The dead-space volume was 40%.

An agglomeration of individual fibers and split fiber bundles resulted that was able to be processed into a more uniform nonwoven fabric compared with untreated filament yarn pieces after that in the production of combed, needle-punched nonwoven fabric. The filling flap was opened for 2 s after the material supply area was filled to load the material, and the material outlet flap was likewise opened for 2 s after the end of the treatment process for a complete emptying of the treatment chamber into a pneumatic suction pipe.

Example 2

Basalt fiber bundle with a length of 50 mm and an individual mass of 0.00537 g was available in the form of bulk material with a bulk density of 200 kg/m3. This material was treated in batches of 300 g each for 12 s with a device in accordance with FIG. 1 using a sieve plate with a hole width of 5 mm. In contrast to Example 1, 60% dead-space volume was set here with a reduced number of striking elements. 750 r.p.m. was used as the striking-element speed. An agglomeration of individual fibers and split fiber bundles resulted with a bulk density of 26 kg/m3. This material disaggregation resulted from the lengthwise splitting of the fiber bundles into partial bundles and individual fibers.

Example 3

300 g using UD carbon multiaxial layings sewn together with a glass filament system in a planar form of around 16 cm2 to 25 cm2 with maximum edge lengths of <8 cm and a mass per unit area of 650 g/m2 was treated with a device in accordance with FIG. 1 for 6 s with a striking-element speed of 1,200 r.p.m. The buckling striking element from FIG. 2 was likewise used without an additional return-spring element. The dead-space volume was designed to be 50%. Four retaining elements with a width of 5 mm, arranged with an equal spacing to one another and projecting into the dead space in parallel with the axis of rotation of the striking elements, were attached around the periphery of the stator housing to increase the separation effect on the fiber bundles. These retaining elements had a cubical form and their lengths corresponded to the width of the milling chamber. A tangled jumble of individual carbon fibers and carbon fiber bundles resulted that consisted of a differing number of individual fibers commingled with threads and thread pieces of the sewing threads.

LIST OF REFERENCE NUMERALS

Figure 2A:
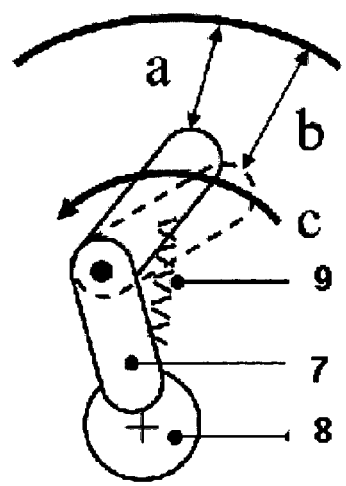
FIG. 2a shows a two-part striking element that rotates in the direction of the arrow via the drive shaft.
Figure 2B:
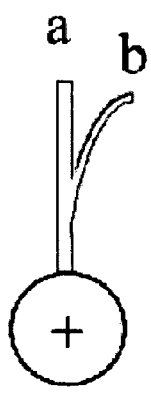
FIG. 2b shows elastic bending so that the striking elements can avoid excessive material accumulations against the direction of rotation for a short period of time.
Figure 2C:
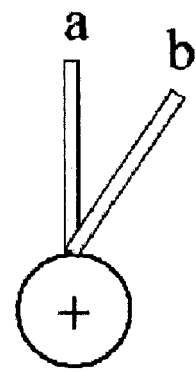
FIG. 2c shows a tilting feature to avoid excessive material accumulations.

FIG. 1
1 Striking unit
2 Milling or stator chamber
3 Material supply unit
4 Material discharge unit/removal area
5 Flap mechanism for the material discharge unit/outlet flap
6 Flap mechanism for the material supply
7 Striking element FIG. 2
7 Striking element
8 Drive shaft
9 Pressure spring mechanism
a Spacing to the stator wall
b Enlarged spacing to the stator wall
c Direction of rotation

The invention claimed is:

1. Device for mechanically splitting finite textile fiber bundles, comprising n individual fibers (n≥2) in fiber bundles having less than n individual fibers and/or individual fibers, wherein, in a milling chamber that is closed off from the outside and that has one or more dead spaces of at least 10% of the milling chamber volume and in which one or more rotating striking elements operate in a non-cutting manner and so as to reduce load peaks and at a rotational speed that can be adapted to the material but that is at least 200 r.p.m., the material is adjustably input in different amounts in batches, treated for an adjustable duration, and then discharged again from the milling chamber, wherein the rotating milling unit is equipped with one or more propeller-type striking elements arranged one in back of the other on a drive shaft in the direction of the axis for longitudinal splitting of the textile material into fibrous components, characterized in that the striking elements have sufficient size to mechanically split textile fiber bundles into bundles with fewer fibers or individual fibers and are arranged to elastically rebound or tilt away for gentle treatment of the material and are therefore able to sporadically evade material accumulations that arise during the treatment for a short period of time, and load peaks that are damaging to the material are avoided.

2. Device according to claim 1, characterized in that the material is continuously filled into a storage chamber of the device that fills the milling chamber in batches via a time-interval controlled flap device, and the material is likewise transferred out through a time-interval controlled material discharge flap.

3. Device according to claim 1, characterized in that flaps delimiting the material supply and discharge areas are perforated.

4. Device according to claim 1, characterized in that the material is discharged into pneumatically suctioned pipeline.

5. Device according to claim 1, characterized in that the time period for filling, the time period for treatment and the time period for the material discharge can be freely set.

6. Device according to claim 1, characterized in that the surface of the milling chamber is designed to be configurable with different amounts of wall roughness or can optionally be equipped with exchangeable, additional elements that project into the dead space and that do not have a cutting effect.

7. Method for mechanically splitting finite textile fiber bundles, comprising n individual fibers (n≥2), into fiber bundles having less than n individual fibers and/or individual fibers, comprised of the following steps:

inputting fiber bundles into a milling chamber that is closed off from the outside and that has one or more dead spaces of at least 10% of the milling chamber volume, subjecting the fiber bundles to striking forces from one or more propeller-type striking elements arranged one in back of the other on a drive shaft in the milling chamber to longitudinally split the textile fiber bundles into fibrous components, wherein said striking elements have sufficient mass and size to mechanically split textile fiber bundles into bundles with fewer fibers or individual fibers, continuing to apply said striking forces within a time window adapted to the material until the desired degree of fiber separation is obtained,
outputting the fibrous components,
wherein the upper part of the striking element tilts against the direction of rotation when there are load peaks because of incidental material accumulations and returns to its starting position again after the load peak.

\* \* \* \* \*